(12) United States Patent
Al-Alusi et al.

(10) Patent No.: US 9,067,680 B2
(45) Date of Patent: Jun. 30, 2015

(54) AIRCRAFT OUTFLOW VALVE

(75) Inventors: Thamir R. Al-Alusi, Mukilteo, WA (US); Leigh M. Sedgwick, Mercer Island, WA (US); Coyne Foster, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 13/248,712

(22) Filed: Sep. 29, 2011

(65) Prior Publication Data

US 2013/0084791 A1 Apr. 4, 2013

(51) Int. Cl.
*B64D 13/00* (2006.01)
*B64D 13/02* (2006.01)

(52) U.S. Cl.
CPC ...................................... *B64D 13/02* (2013.01)

(58) Field of Classification Search
CPC ................................ B64D 13/02; B60H 1/248
USPC .................................. 454/71, 74, 76; 137/630
See application file for complete search history.

(56) References Cited

U.S. PATENT DOCUMENTS

| 2,830,521 | A | * | 4/1958 | Fischer et al. | 454/73 |
|---|---|---|---|---|---|
| 3,101,918 | A | * | 8/1963 | Evelyn et al. | 244/76 R |
| 3,426,984 | A | * | 2/1969 | Emmons | 244/117 R |
| 3,436,039 | A | * | 4/1969 | Emmons et al. | 244/129.5 |
| 3,486,721 | A | * | 12/1969 | Myczinski | 244/53 R |
| 3,544,045 | A | * | 12/1970 | Butscher | 244/129.1 |
| 3,740,006 | A | * | 6/1973 | Maher | 244/129.5 |
| 6,116,541 | A | * | 9/2000 | Chuang et al. | 244/129.4 |
| 6,159,091 | A |   | 12/2000 | Horstman et al. |   |
| 6,273,136 | B1 | * | 8/2001 | Steinert et al. | 137/630 |
| 6,634,597 | B2 | * | 10/2003 | Johnson et al. | 244/118.5 |
| 6,682,413 | B1 | * | 1/2004 | Hoffman et al. | 454/156 |
| 6,979,257 | B2 |   | 12/2005 | Horner et al. |   |
| 7,198,062 | B2 | * | 4/2007 | Hoffman et al. | 137/601.09 |
| 7,778,735 | B2 |   | 8/2010 | Gray |   |
| 8,240,331 | B2 | * | 8/2012 | Appleby et al. | 137/527 |
| 8,342,920 | B2 | * | 1/2013 | Tanner et al. | 454/71 |
| 8,439,061 | B2 | * | 5/2013 | Baumann | 137/15.1 |
| 2004/0238046 | A1 | * | 12/2004 | Hoffman et al. | 137/601.08 |
| 2007/0089746 | A1 | * | 4/2007 | Mitchell et al. | 128/205.15 |
| 2008/0233854 | A1 |   | 9/2008 | Horner et al. |   |

(Continued)

FOREIGN PATENT DOCUMENTS

| EP | 2 428 446 A2 | 3/2012 |
|---|---|---|
| WO | 2012/019796 A1 | 2/2012 |

OTHER PUBLICATIONS

Extended European Search Report issued in European Application No. 12186132.2 on Dec. 19, 2012.

*Primary Examiner* — Alissa Tompkins
*Assistant Examiner* — Jonathan Cotov
(74) *Attorney, Agent, or Firm* — Armstrong Teasdale LLP (57) ABSTRACT

Outflow valves for use in an aircraft are described. In one example, an outflow valve for use in an aircraft includes a frame configured for coupling to an aircraft and a gate pivotally coupled to said frame. The frame includes a forward flange extending above the frame. The gate is pivotally moveable between a closed position to substantially block airflow between an interior of the aircraft and an exterior of the aircraft and an exhaust position to direct airflow from the interior toward the exterior of the aircraft. The forward edge of the gate is located adjacent the frame forward flange as the gate is pivoted between the closed position to the exhaust position.

17 Claims, 6 Drawing Sheets

(56) References Cited

U.S. PATENT DOCUMENTS

| | | |
|---|---|---|
| 2010/0173575 A1 | 7/2010 | Horner et al. |
| 2010/0203818 A1* | 8/2010 | Gray et al. ............... 454/74 |
| 2010/0210201 A1* | 8/2010 | Dreisilker et al. ......... 454/74 |
| 2010/0216385 A1* | 8/2010 | Heuer ...................... 454/71 |
| 2010/0240291 A1* | 9/2010 | Tanner et al. ............. 454/72 |
| 2011/0107777 A1 | 5/2011 | Atkey et al. |
| 2012/0064813 A1* | 3/2012 | Horner et al. ............. 454/71 |

\* cited by examiner

AIRCRAFT OUTFLOW VALVE

BACKGROUND

The field of the disclosure relates generally to valves, and more specifically to outflow valves for use in an aircraft.

In aircraft pressurizing and ventilating systems, an air pressure source is typically provided to supply pressurized air to the cabin. Air pressure within the cabin is maintained at the required pressure by controlling the flow of air from the cabin through one or more outflow valves positioned in an opening or openings defined in the body of the aircraft. Air provided by the air pressure source is sometimes also used to cool various electronic devices within the aircraft.

Failures interrupting the supply of pressurized air from these air pressure sources may result in increased cabin temperatures, increased cabin humidity, an increased concentration of undesired gasses (such as carbon dioxide), and/or an increased likelihood of overheating equipment. Consequently, at least some aircraft include an alternate air supply device for use in ventilating the aircraft and cooling the electronic control and navigation devices in the event of a failure of the primary pressurized air system. However, alternate air supply systems generally increase the cost, weight, and complexity of an aircraft.

BRIEF DESCRIPTION

In one aspect, an outflow valve for use in an aircraft is provided. The outflow valve includes a frame configured for coupling to an aircraft and a gate pivotally coupled to the frame. The frame defines an interior direction towards an interior of the aircraft, and an exterior direction towards an exterior of the aircraft. The gate is configured for pivotal movement between a closed position and an exhaust position to direct airflow from the interior of the aircraft to the exterior of the aircraft. A forward portion of the frame includes a flange extending in the interior direction to maintain a limited gap between a forward edge of the gate and the frame forward portion while the gate is pivotally moved between the closed position and the exhaust position.

In another aspect, an outflow valve for use in an aircraft includes a frame configured for coupling to an aircraft and a gate pivotally coupled to said frame. The frame includes a forward flange extending above the frame. The gate is pivotally moveable between a closed position to substantially block airflow between an interior of the aircraft and an exterior of the aircraft and an exhaust position to direct airflow from the interior toward the exterior of the aircraft. The forward edge of the gate is located adjacent the frame forward flange as the gate is pivoted between the closed position to the exhaust position.

In yet another aspect, a method of exhausting air from an aircraft is described. The method includes pivotally opening a gate coupled to a frame of an outflow valve from a closed position substantially parallel with an external surface of an aircraft to an exhaust position defining an angle to the external surface of the aircraft greater than zero to permit airflow from an interior of the aircraft to an exterior of the aircraft between the frame and a rear edge of the gate. The method includes maintaining a substantially constant gap between a forward edge of the gate and a flange extending from the frame toward an interior of the aircraft to substantially minimize airflow into the interior of the aircraft between the forward edge of the gate and the frame.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Exemplary outflow valves are described herein. The exemplary outflow valves described herein provide greater net airflow than some known outflow valves. Moreover, the exemplary outflow valves limit the amount of air that flows through the valve opposite to a direction that is the desired direction of flow, and thus provide a greater net airflow at each valve. The increased airflow may provide sufficient airflow for ventilation and cooling in an aircraft during a loss of inflow condition such that a separate backup system is not needed. As such, the outflow valves described herein may reduce the cost, the complexity, and/or the weight of an associated aircraft.

Figure 1:
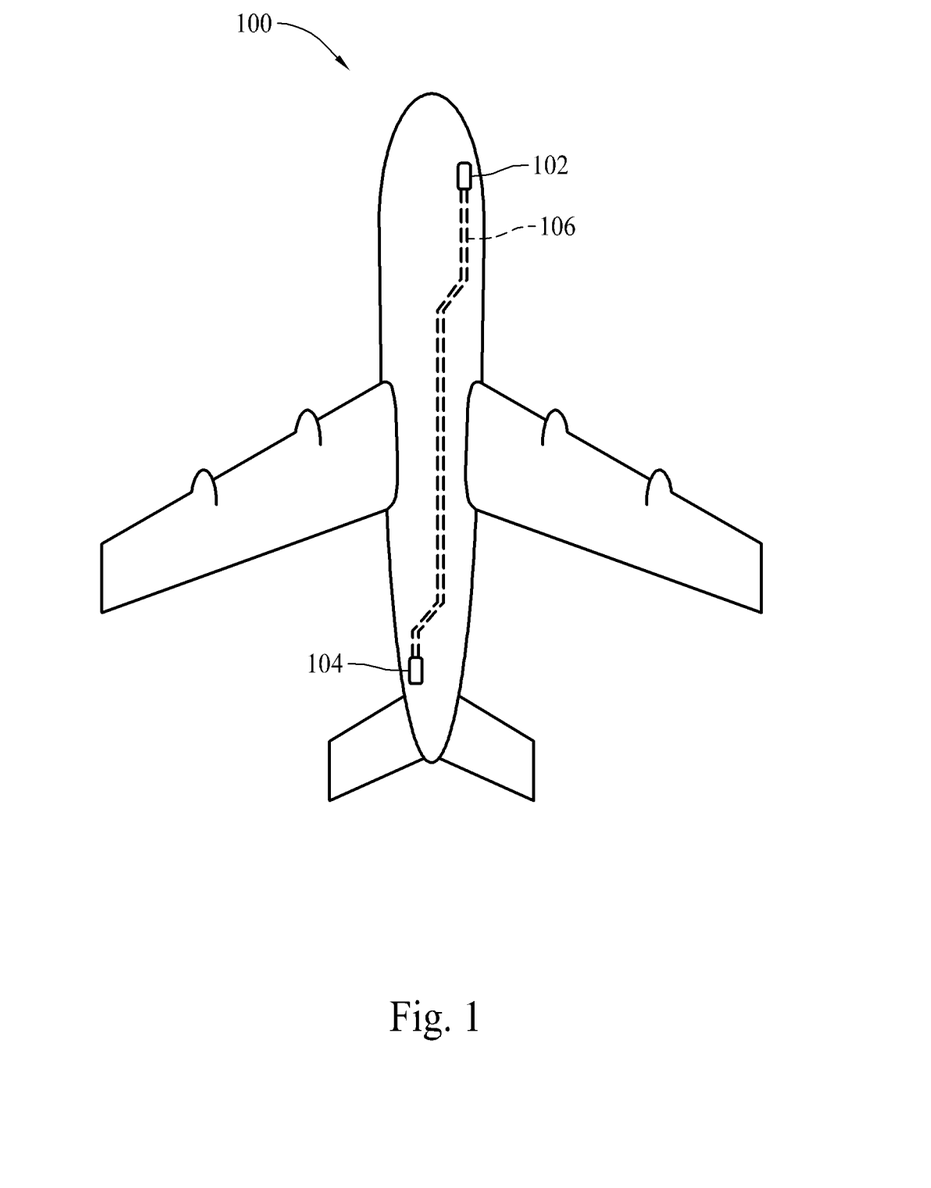
FIG. 1 is a bottom plan view of an exemplary aircraft.

Referring more particularly to the drawings, embodiments of the disclosure may be described in the context of an aircraft 100 as shown in FIG. 1. In the exemplary embodiment, aircraft 100 includes a forward outflow valve 102 and a rearward or aft outflow valve 104 coupled by an airflow conduit 106. Outflow valves 102 and 104 are used to control the flow of air out of aircraft 100. The airflow controlled by outflow valves 102 and 104 may be used to control the climate, including the air pressure, within aircraft 100, and/or to ventilate and/or cool electronics (not shown) within aircraft 100. Moreover, in the event of failure of one or more other systems, such as the aircraft air conditioning systems (not shown), outflow valves 102 and 104 may be one of the only sources of air flow into and through aircraft 100 via airflow conduit 106.

During a Loss of Inflow (LOI) condition (e.g., cabin depressurization condition during the malfunction of the air-conditioning packs), the airflow used for the occupants of the airplane and for the cooling of the electronic equipment may be provided through outflow valves 102 and 104. More specifically, one valve 102 or 104 (typically rear valve 104) will be in an intake or scoop configuration (not shown in FIG. 1) and the remaining valve 104 or 102 (typically forward valve 102) will be in an exhaust configuration (not shown in FIG. 1). More specifically, the exhaust configuration and scoop configuration will be further described below with reference to FIGS. 2-9. During such a condition, air generally enters the aircraft through the outflow valve 102 or 104 in the scoop configuration, and exits aircraft 100 through outflow valve 104 or 102 in the exhaust configuration. In each configuration, however, outflow valves 102 and 104 may allow air to enter or exit aircraft 100 in addition to the desired exhaust or intake of air by that particular outflow valve 102 or 104. Thus, each valve 102 and 104 has a net airflow, i.e. the difference between the airflow into and out of that particular valve 102 or 104. Further, the airflow through aircraft as a result of outflow valves 102 and 104 is a result of the net airflow for each valve 102 and 104 and the net airflow between valves 102 and 104. The net airflow between outflow valves 102 and 104 generally depends on the pressure differential at the location of each valve 102 and 104. Various embodiments of outflow valves described herein may provide increased net airflow for individual outflow valves as compared to some known valves, such that total airflow thorough aircraft 100 is facilitated to be increased.

Figure 2:
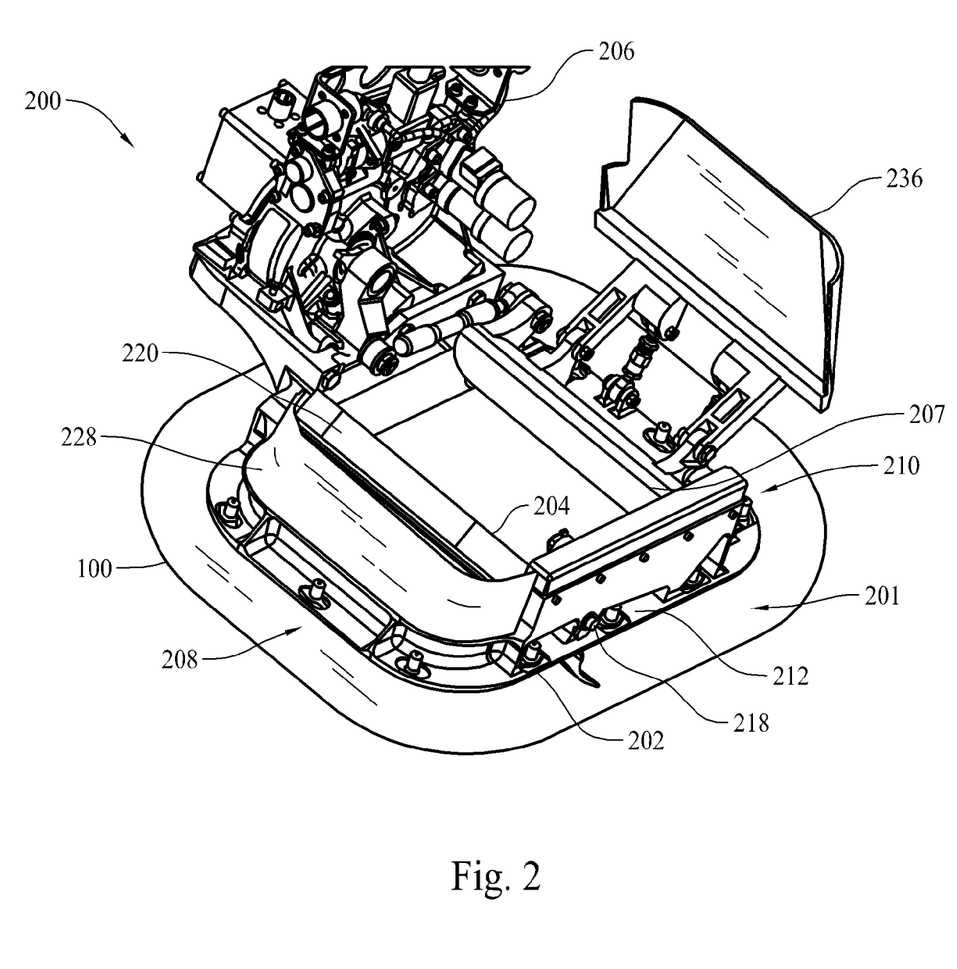
FIG. 2 is a perspective view of an exemplary outflow valve that may be used with the aircraft shown in FIG. 1 and in an exhaust configuration.
Figure 3:
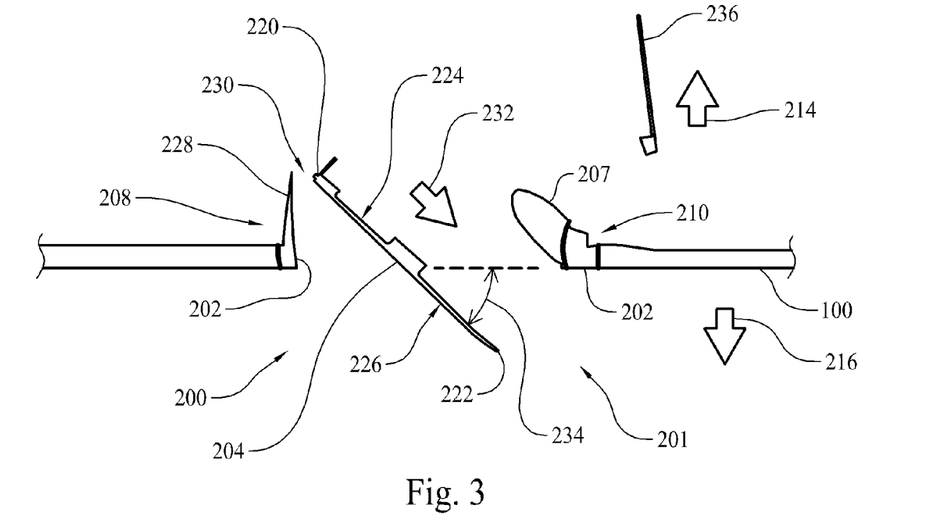
FIG. 3 is a simplified cross sectional side view of the outflow valve shown in FIG. 2.
Figure 4:
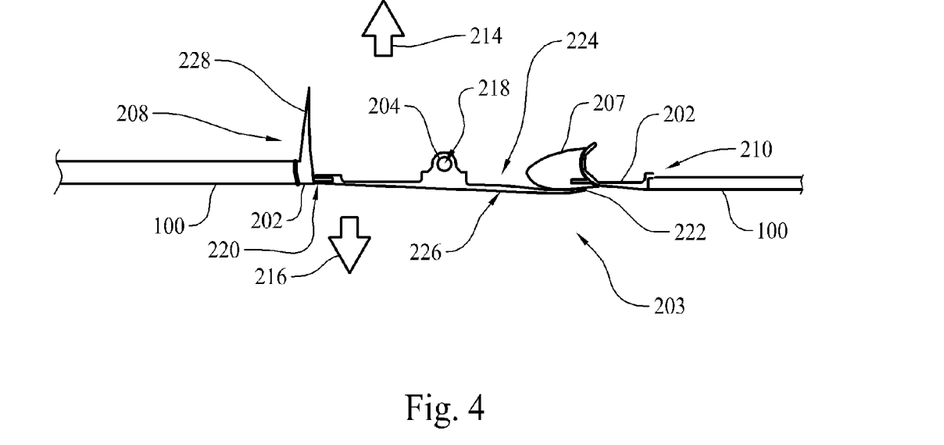
FIG. 4 is a simplified cross sectional side view of the outflow valve shown in FIG. 2 in a closed configuration.
Figure 5:
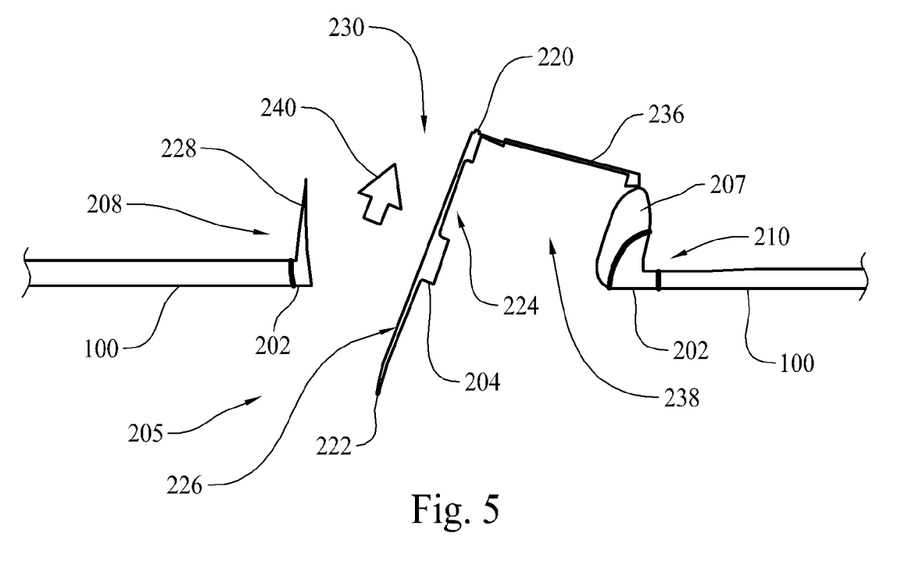
FIG. 5 is a simplified cross sectional side view of the outflow valve shown in FIG. 2 in the scoop configuration.

FIGS. 2-5 each illustrate an exemplary outflow valve 200 for use in an aircraft, such as aircraft 100. More specifically, FIG. 2 is a perspective view of outflow valve 200 in an exhaust configuration 201 and FIG. 3 is a simplified cross-sectional side view of outflow valve 200 in the exhaust configuration 201. FIG. 4 is a simplified cross sectional side view of outflow valve 200 in a closed configuration 203. FIG. 5 is a simplified cross sectional side view of outflow valve 200 in a scoop configuration 205.

Generally, outflow valve 200 controls airflow interchange between an interior of aircraft 100 and an exterior of aircraft 100. When installed in aircraft 100 and in the closed configuration 203 (shown in FIG. 4), valve 200 substantially prevents air from flowing into or out of aircraft 100 through outflow valve 200. Air from inside aircraft 100 is exhausted to the exterior of aircraft 100 when valve 200 is in the exhaust configuration 201 (shown in FIGS. 2 and 3). Conversely, when in the scoop configuration 205 (shown in FIG. 5), outflow valve 200 directs external air into aircraft 100.

In the exemplary embodiment, outflow valve 200 includes a frame 202, a ground gate 204, a control gate 207, and an actuator 206. Moreover, in the exemplary embodiment, frame 202 includes a forward portion 208, a rearward portion 210, and a pair of opposing sides 212 that extend between forward portion 208 and rearward portion 210. Frame 202 is configured for mounting to aircraft 100 and defines an interior direction 214 towards an interior of aircraft 100, and an exterior direction 216 towards exterior of aircraft 100.

Gate 204 is coupled to frame 202. In the exemplary embodiment, gate 204 is pivotally coupled to frame 202 via a pivot point 218 (shown in FIGS. 2 and 4). Thus, gate 204 may pivotally move between various positions relative to frame 202. More specifically, exemplary gate 204 may selectively pivot, for example, between closed position 203 (shown in FIG. 4), exhaust position 201 (shown in FIGS. 2 and 3), and a scoop position 205 (shown in FIG. 5).

Gate 204 includes a forward edge 220, an aft or rearward edge 222 (shown in FIG. 3), an inner surface 224, and an outer surface 226. Because gate 204 is pivotally coupled to frame 202, forward edge 220 is not always located closer to forward portion 208 than to rearward portion 210. For example, in the scoop configuration 205 (shown in FIG. 5), forward edge 220 is closer to rearward portion 210 than forward portion 208. Similarly, inner surface 224 and outer surface 226 are not always oriented towards an interior or exterior, respectively, of aircraft 100 in all configurations. The terms "forward", "rearward", "inner", and "outer" are generally assigned based on the closed configuration 203 (shown in FIG. 4) of outflow valve 200. More specifically, when gate 204 is in the closed position 203, forward edge 220 is located adjacent the forward portion 208, rearward edge 222 is located adjacent to the rearward portion 210, inner surface 224 is oriented towards interior direction 214, and outer surface 226 is oriented towards exterior direction 216.

In the exemplary embodiment, frame 202 includes a flange 228 that extends inwardly 214 from frame forward portion 208. When gate 204 is in a position other than the closed position 203, a gap 230 (shown in FIGS. 3 and 5) is defined between forward edge 220 and flange 228. Flange 228 is configured, e.g., sized, shaped, etc., to limit the size of gap 230 when gate 204 is moved between the closed position 203 and the exhaust position 201. With reference to FIG. 3, in the exhaust position 201, airflow from the interior of aircraft 100 is exhausted to the exterior of aircraft 100 in exhaust direction 232. The air being exhausted passes between gate 204 inner surface 224 and control gate 207 at frame 202 rearward portion 210. Air from outside aircraft 100 may attempt to flow into the interior of aircraft 100 through gap 230. Flange 228 facilitates minimizing an amount of external air that may flow into aircraft 100 through outflow valve 200 when outflow valve 200 is not in an intake or scoop configuration 205. It should be noted that, flange 228 may be a monolithic portion of frame 202, may be formed integrally with frame 202, or may be a separately coupled to frame 202.

As shown in FIG. 2, in the exemplary embodiment, flange 228 extends from forward portion 208 around a portion of sides 212. Thus, in addition to limiting gap 230, flange 228 also limits the size of gaps (not shown) defined between gate 204 and sides 212 when gate 204 is moved between the closed position 203 and the exhaust position 201. In other embodiments, flange 228 may not extend around sides 212 and/or may extend further along sides 212 than is illustrated.

With reference to FIG. 3, in the exhaust configuration 201 gate 204 is positioned at an opening angle 234 of about forty-five degrees relative to frame 202. In other embodiments, opening angle 234 may be smaller or larger than forty-five degrees. Moreover, in some embodiments, opening angle 234 may be selectively varied to facilitate controlling the flow of air from the interior of aircraft 100 to the exterior of aircraft 100. Flange 228 generally extends to limit gap 230 for a range of opening angles 234 from about zero degrees to the maximum opening angle 234 of each particular embodiment.

Outflow valve 200 includes a rear cover 236. As shown in FIGS. 2-4, rear cover 236 is generally maintained a distance from gate 204 when outflow valve 200 is in the closed and/or exhaust configurations 203 (shown in FIG. 4) and 201 (shown in FIGS. 2 and 3), respectively. When outflow valve 200 is in the scoop or intake configuration 205 (shown in FIG. 5), however, rear cover 236 is used to facilitate minimizing an amount of air exhausted from interior of aircraft 100 through outflow valve 200. When valve 200 is in the scoop configuration 205, gate 204 is pivoted such that forward edge 220 is closer to frame rearward portion 210 than to frame forward portion 208, and gap 230, defined between forward edge 220 and flange 228, is relatively large. A rearward gap 238 defined between forward edge 220 and control gate 207 is substantially closed by rear cover 236. In this configuration, air from outside aircraft 100 is scooped into aircraft 100 in the intake direction 240 and flows between gate outer surface 226 and frame forward portion 208. Rear cover 236 may have any shape suitable for substantially closing rearward gap 238 including, for example, a flat shape, a curved shape, a convex shape, a concave shape, etc.

Figure 6:
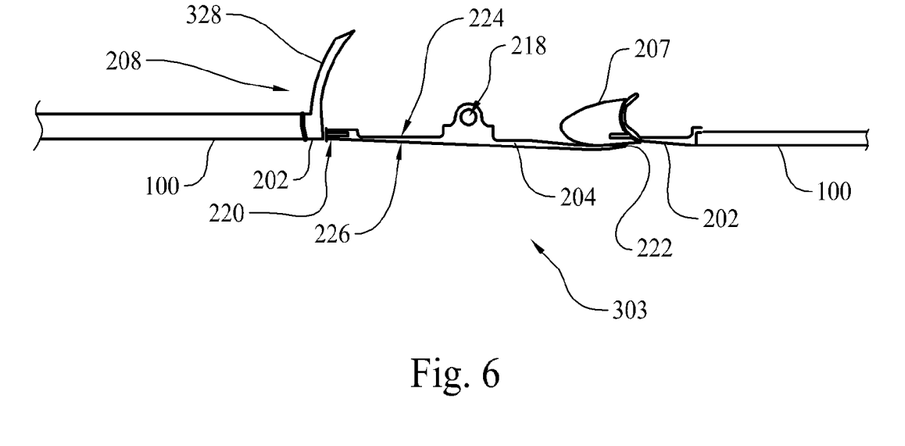
FIG. 6 is a simplified cross sectional side view of another exemplary outflow valve that may be used with the aircraft shown in FIG. 1 and in a closed configuration.
Figure 7:
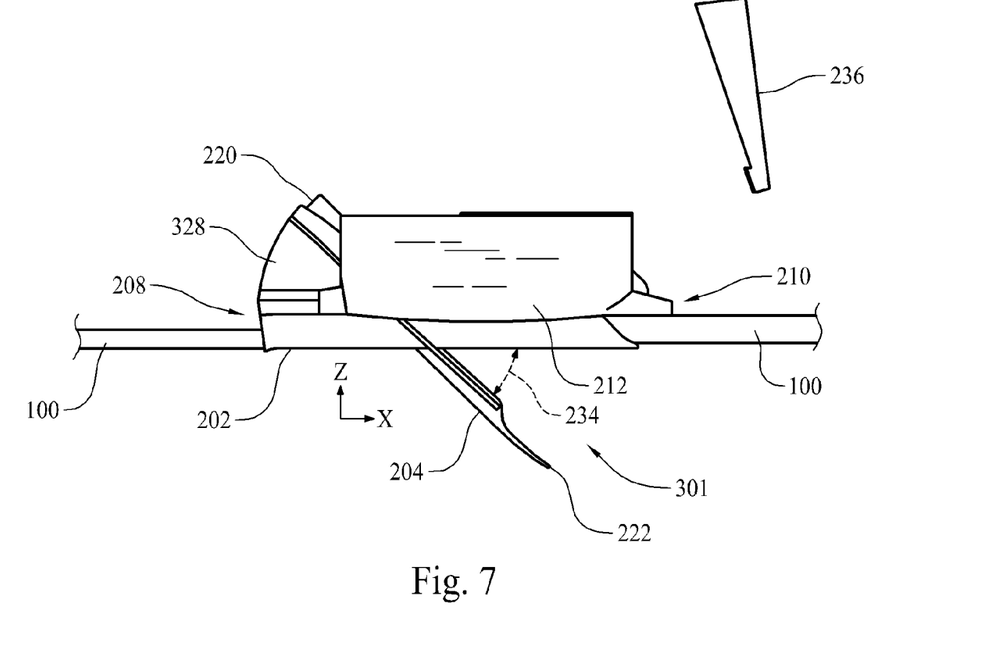
FIG. 7 is a side view of the outflow valve shown in FIG. 6 in an exhaust configuration.
Figure 8:
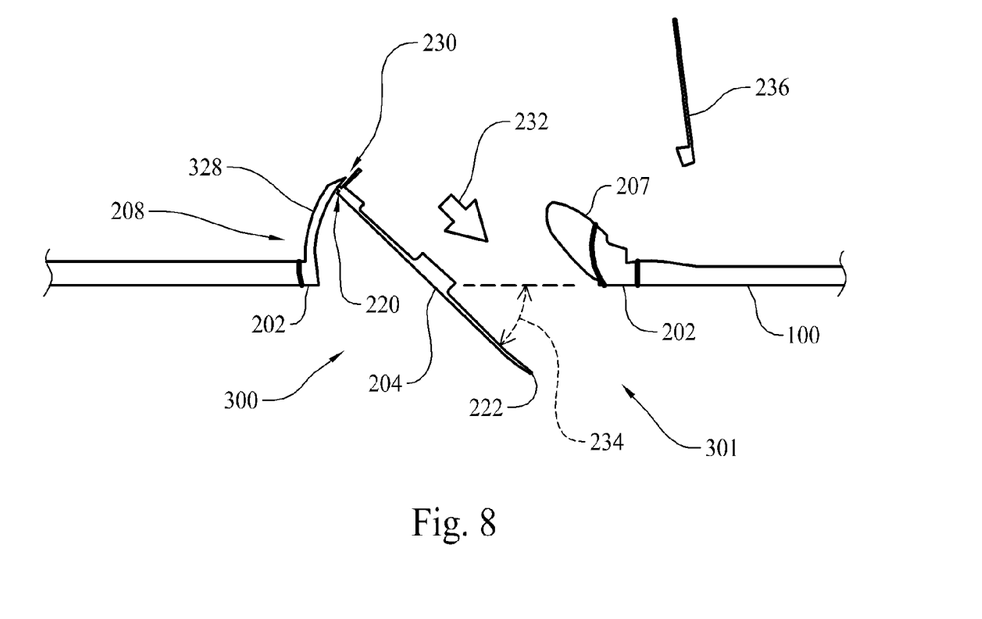
FIG. 8 is a simplified cross sectional side view of the outflow valve shown in FIG. 6 in the exhaust configuration.
Figure 9:
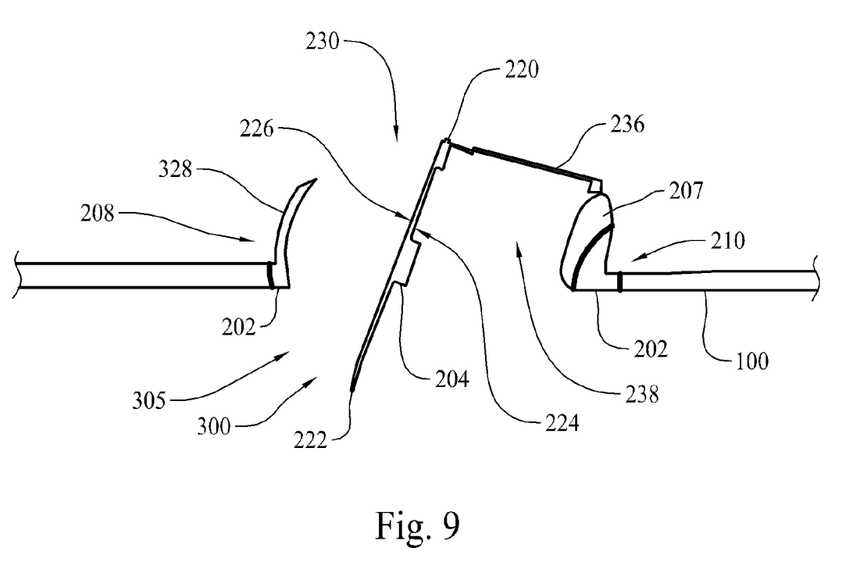
FIG. 9 is a simplified cross sectional side view of the outflow valve shown in FIG. 6 in the scoop configuration.

Another exemplary outflow valve 300 is shown in FIGS. 6-9. Outflow valve 300 is similar to outflow valve 200 and the same reference numerals will be used to identify common components. FIG. 6 is a simplified cross-sectional side view of exemplary outflow valve 300 installed in aircraft 100, and in a closed configuration 303. FIG. 7 is a side view of exemplary outflow valve 300 in an exhaust configuration 301. FIG. 8 is a simplified cross-sectional side view of outflow valve 300 in the exhaust configuration 301. FIG. 9 is a simplified cross-sectional side view of outflow valve 300 in a scoop configuration 305.

Outflow valve 300 includes a flange 328 extending inwardly 214 from frame forward portion 208. Unlike exemplary flange 228, flange 328 is curved. More specifically, flange 328 is curved to substantially match a path, or arc, traced by gate forward edge 220 when gate 204 moves between the closed position 303 (shown in FIG. 6) and the exhaust position 301 (shown in FIGS. 7 and 8). Thus, flange 328 limits gap 230 when gate 204 moves between the closed position 303 and the exhaust position 301, and limits inflow of air through gap 230. Moreover, because flange 328 is curved to substantially match the path of forward edge 220, gap 230 remains substantially constant, and relatively small, for all opening angles 234 between the closed position 303 and the exhaust position 301. It should be noted that flange 328 may be a monolithic portion of frame 202, may be integrally constructed with frame 202, or may be a separately coupled to frame 202.

As shown in FIG. 7, in the exemplary embodiment, flange 328 extends from forward portion 208 around a portion of sides 212. Thus, in addition to limiting gap 230, flange 328 limits the size of gaps (not shown) defined between gate 204 and sides 212 when gate 204 is moved between the closed position 303 and the exhaust position 301. In other embodiments, flange 328 may not extend around sides 212, and/or may extend further along sides 212 than is illustrated.

With reference to FIG. 7, in the exhaust configuration 301, gate 204 is positioned at an opening angle 234 of about forty-five degrees relative to frame 202. In other embodiments, opening angle 234 may be smaller or larger than forty-five degrees. Moreover, in some embodiments, opening angle 234 may be selectively varied to control the flow of air from the interior of aircraft 100 to the exterior of aircraft 100. Flange 328 generally limits gap 230 for a range of opening angles 234 from zero degrees to the maximum opening angle 234 of each particular embodiment.

The above described outflow valves provide greater net airflow than is possible in at least some known outflow valves. The exemplary outflow valves limit the amount of air that flows through the valve in the opposite direction to the desired direction of flow. Thus, a greater net airflow is achieved at each valve, and the net airflow through the associated aircraft is facilitated to be increased. Moreover, the increased net airflow may provide sufficient airflow for ventilation and cooling in an aircraft during a loss of inflow condition such that a separate backup system is not needed. Elimination of a backup ventilation system may reduce the cost, complexity, and/or weight of an aircraft including the exemplary outflow valves described herein.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An outflow valve for use in an aircraft, said outflow valve comprising:

a frame configured for coupling to an aircraft, said frame comprising a forward portion and a rearward portion, and defining an interior direction towards an interior of the aircraft, and an exterior direction towards an exterior of the aircraft; and a gate pivotally coupled to said frame at a pivot point that is substantially coplanar with said frame and located substantially midway between a first edge of said gate and a second edge of said gate, said gate pivotally moveable between a closed position, an intake position, and an exhaust position to direct airflow between the interior of the aircraft and the exterior of the aircraft; and wherein said forward portion of said frame comprises a flange extending in the interior direction to maintain a limited gap between the first edge of said gate and the forward portion of said frame while said gate is pivotally moved between the closed position and the exhaust position, and said flange extending in a substantially normal direction relative to said frame such that the limited gap increases in size at a lower rate than a second gap defined between the second edge of said gate and the rearward portion of said frame, wherein a distance between the first edge of said gate and the forward portion of said frame is greater than a distance between the first edge of said gate and the rearward portion of said frame when said gate is in the intake position, and a distance between the first edge of said gate and the forward portion of said frame is less than a distance between the first edge of said gate and the rearward portion of said frame when said gate is in the exhaust position.

2. An outflow valve in accordance with claim 1, wherein the flange is configured to maintain a limited gap by maintaining a substantially constant gap between the first edge of said gate and the forward portion of said frame while said gate is pivotally moved between the closed position and the exhaust position.

3. An outflow valve in accordance with claim 2, wherein the flange is curved to substantially match a path of the first edge of said gate when said gate is pivotally moved between the closed and exhaust positions.

4. An outflow valve in accordance with claim 1, wherein the flange extends in the interior direction along the forward portion of said frame.

5. An outflow valve in accordance with claim 1, further comprising a flap that covers the second gap between the first edge of said gate and the rearward portion of said frame when said gate is in the intake position.

6. An outflow valve in accordance with claim 1, wherein said gate is configured to pivot about 45 degrees between the closed position and the exhaust position.

7. An outflow valve in accordance with claim 1, wherein said frame further includes an opening defined therein through which airflow is channeled between the aircraft interior and the aircraft exterior, said flange extending from said frame one of substantially perpendicularly from said frame or such that at least a portion of said flange overhangs at least a portion of the opening.

8. An outflow valve for use in an aircraft, said outflow valve comprising:
   a frame configured for coupling to an aircraft, said frame comprising a body, a forward flange extending above said body, and a rearward portion;
   a gate pivotally coupled to said frame at a pivot point that is substantially coplanar with said frame and located substantially midway between a first edge of said gate and a second edge of said gate, said gate pivotally moveable between a closed position to substantially block airflow between an interior of the aircraft and an exterior of the aircraft, an intake position to direct airflow from the exterior toward the interior of the aircraft through a first gap defined between the first edge of said gate and said forward flange, and an exhaust position to direct airflow from the interior toward the exterior of the aircraft through a second gap defined between the second edge of said gate and the rearward portion of said frame, wherein the second gap changes size at a lower rate than the first gap as said gate pivotally moves between the closed and intake positions, wherein the first edge of said gate is located adjacent said frame forward flange substantially throughout pivotal movement of said gate between the closed position to the exhaust position, wherein a distance between the first edge of said gate and said frame forward flange is greater than a distance between the first edge of said gate and the rearward portion of said frame when said gate is in the intake position, and a distance between the first edge of said gate and said frame forward flange is less than a distance between the first edge of said gate and the rearward portion of said frame when said gate is in the exhaust position.

9. An outflow valve in accordance with claim 8, wherein said frame forward flange is configured to limit airflow into the interior of the aircraft between the first edge of said gate and said frame forward flange.

10. An outflow valve in accordance with claim 9, wherein said frame forward flange is configured to maintain the first gap as a substantially constant gap.

11. An outflow valve in accordance with claim 10, wherein said frame forward flange extends from said body substantially along a path defined by the first edge of said gate as it moves between the closed position and the exhaust position.

12. An outflow valve in accordance with claim 8, wherein said gate defines an angle of about 45 degrees relative to the rearward portion of said frame when said gate is in the exhaust position.

13. An outflow valve in accordance with claim 8, wherein said frame forward flange extends along the forward portion of said frame.

14. An outflow valve in accordance with claim 8, further comprising an actuator for pivotally moving said gate.

15. A method of exhausting air from an aircraft comprising:
   pivotally opening a gate coupled to a frame of an outflow valve from a closed position substantially parallel with an external surface of an aircraft to an exhaust position defining an angle to the external surface of the aircraft greater than zero to permit airflow from an interior of the aircraft to an exterior of the aircraft through a first gap defined between a first edge of said gate and a rearward portion of said frame, and to permit airflow from the exterior of the aircraft to the interior of the aircraft through a second gap defined between a second edge of said gate and a flange extending in a substantially normal direction relative to the frame towards the interior of the aircraft, wherein the second gap changes size at a lower rate than the first gap as said gate pivotally moves between the closed and exhaust positions, wherein the gate pivots about a pivot point that is substantially coplanar with the frame and located substantially midway between opposing distal edges of the gate, wherein a distance between the first edge of the gate and a forward portion of the frame is greater than a distance between the first edge of the gate and the rearward portion of the frame when the gate is in the intake position, and a distance between the first edge of the gate and the forward portion of the frame is less than a distance between the first edge of the gate and the rearward portion of the frame when the gate is in the exhaust position; and
   maintaining the second gap substantially constant to substantially minimize airflow into the interior of the aircraft between the first edge of the gate and the frame.

16. A method in accordance with claim 15 wherein the flange extending from the frame comprises a curved flange defining an arc having a center approximately located at a pivot point of the gate.

17. A method in accordance with claim 15 wherein the flange extending from the frame comprises a flange extended toward the interior of the aircraft a sufficient distance to remain adjacent the first edge of the gate substantially throughout said pivotally opening the gate from the closed position to the exhaust position.

* * * * *